United States Patent
Mao et al.

(12)

(10) Patent No.: US 12,025,534 B2
(45) Date of Patent: Jul. 2, 2024

(54) LEAK DETECTION

(71) Applicant: ULTRA CLEAN HOLDINGS, INC., Hayward, CA (US)

(72) Inventors: Gethin Mao, Shanghai (CN); Kevin Shi, Shanghai (CN); Jaya Chandran, Singapore (SG)

(73) Assignee: ULTRA CLEAN HOLDINGS, INC., Hayward, CA (US)

( * ) Notice: Subject to any disclaimer, the term of this patent is extended or adjusted under 35 U.S.C. 154(b) by 0 days.

(21) Appl. No.: 17/975,672

(22) Filed: Oct. 28, 2022

(65) Prior Publication Data

US 2023/0137594 A1     May 4, 2023

(30) Foreign Application Priority Data

Nov. 1, 2021   (SG) .............................. 10202112119V

(51) Int. Cl.
  *G01M 3/22*     (2006.01)
  *G01M 3/20*     (2006.01)

(52) U.S. Cl.
  CPC .............. *G01M 3/22* (2013.01); *G01M 3/207* (2013.01)

(58) Field of Classification Search
  CPC .......... G01M 3/20; G01M 3/22; G01M 3/225; G01M 3/226
  See application file for complete search history.

(56) References Cited

U.S. PATENT DOCUMENTS

| | | | | |
|---|---|---|---|---|
| 5,479,359 A | * | 12/1995 | Rogero | G01N 1/24 422/62 |
| 7,156,976 B2 | * | 1/2007 | Bley | G01M 3/20 73/49.3 |
| 7,571,634 B2 | * | 8/2009 | Grosse Bley | G01M 3/202 73/23.21 |

(Continued)

FOREIGN PATENT DOCUMENTS

| CN | 103592086 A | 2/2014 |
|---|---|---|
| CN | 109357819 A | 2/2019 |

(Continued)

OTHER PUBLICATIONS

PCT/US2022/078848, International Search Report and Written Opinion dated Feb. 17, 2023, 15 pages.

(Continued)

*Primary Examiner* — Erika J. Villaluna
(74) *Attorney, Agent, or Firm* — Patterson + Sheridan, LLP

(57) ABSTRACT

A method for sensing a leak in a unit under test includes scanning a SKU on a unit under test, sending the SKU information to a compute, connecting the unit under test to a testing apparatus, removing gas from an interior volume of the unit under test, monitoring the vacuum pressure within the interior volume of the unit under test until the vacuum pressure reaches a test pressure, initiating delivery of helium to the exterior of the unit under test through a helium gun by pulling a trigger on the helium gun to dispense helium therefrom, positioning the helium supply gun so that helium is released over a weld of the unit under test, detecting the movement speed of the helium supply gun during the dispensing of helium therefrom, and displaying the helium content internal to the unit under test on a graphical user interface.

16 Claims, 7 Drawing Sheets

(56) References Cited

U.S. PATENT DOCUMENTS

| | | | |
|---|---|---|---|
| 10,794,793 B2 * | 10/2020 | Jourdan | G06F 3/014 |
| 2004/0194533 A1 | 10/2004 | Bohm et al. | |
| 2007/0000310 A1 * | 1/2007 | Yamartino | G01M 3/226 |
| | | | 73/40.7 |

FOREIGN PATENT DOCUMENTS

| | | |
|---|---|---|
| WO | 03/008923 A2 | 1/2003 |
| WO | 2020/147435 A1 | 7/2020 |

OTHER PUBLICATIONS

Singapore Application No. 10202112119V, Search Report dated Feb. 20, 2024, 2 pages.

* cited by examiner

LEAK DETECTION

BACKGROUND

Field

Embodiments of the present invention generally relate to a leak detection apparatus useful to detect leaks from sealable vessels, including sections of pipe or piping, and more particularly to a leak detection apparatus employing helium and a helium detector.

Description of the Related Art

A leak detector can be employed to evaluate the presence and rate or amount of leakage occurring through a weld connecting two sections of a tubing, for example stainless steel tubing's, welded together to form a unit under test having at least one weld and at least two sections of tubing connected at the at least one weld. To perform the test, a lower than the ambient pressure is formed within the interior volume of the unit under test, commonly by connecting the interior of the unit under test to a vacuum pump or a volume at a desired vacuum level (desired sub-ambient, surrounding the unit under test, pressure), and thereafter helium is dispensed around a location of the unit under test such as a weld to be evaluated for leakage. A helium detector in the lower than ambient pressure region to which the interior volume of the unit under test is fluidly connected supplies an indication of whether helium has been detected in the lower than ambient pressure environment within the unit under test, and in some cases the concentration or atomic count thereof.

Helium leak checking is performed regularly on welds used to connect together pipings, and other fluid conduit geometries surrounding an intended to be fluid tight environment, using a helium wand to dispense helium from a helium source, and determine the presence and in some cases amount, of helium passing through the weld. As the helium is a very small atom, it can pass through openings in a weld that larger gas atoms or molecules cannot, because of their size, pass through. The amount of helium detected passing through the weld is an indicator of the porosity of the weld. This helium leak testing is often a manual process, whereby a technician or other operator or user connects the internal volume of a unit under test, for example the internal volume of lengths of piping including fittings and welds therein, to a vacuum source, for example a piping or reinforced hose connected to a vacuum pump, or for example to a factory vacuum line. The operator or user then holds the helium wand, and using a trigger 210 thereon, activates helium flow therefrom while moving the helium dispensing end of the wand over the area of the unit under test being checked for leakage. For example when the portion of the unit under test being evaluated for leakage is a weld, if the helium detector in the vacuum line indicates the presence of helium in the vacuum line over a preset amount or concentration, then the operator or user determines that the weld has failed the test and has unacceptable leakage, and the unit under test is either reworked or scrapped. In this testing paradigm, a small quantity of helium passing through the weld, but below a threshold amount, does not indicate a defective weld but can be used by the operator to monitor the effectiveness of the welding process forming the weld(s) connecting the tubing(s).

This testing methodology suffers from a number of limitations. For example, any record of the information relating to the passing or failing of the unit under test must be kept manually, and thus seldom is there a one to one tracking of a weld to a specific time of testing, or to the source of the weld, such as a specific welding operator, a welding station, the raw materials used to weld the tubings, and the lots from which the welded together tubings were drawn, all useful for defect tracing for quality control purposes. Additionally, the test operator or user affects the testing of the unit under test, because the presence of the proper vacuum pressure in the unit under test, and the speed at which the helium wand is moved over an along a weld, can impact the validity of the test. This can lead to false "passing" of a defective weld.

SUMMARY

In one aspect, an apparatus for detecting a leak in a unit under test includes a helium dispenser connectable to a helium gas source having a motion detector connected thereto, the helium dispenser configured to selectively dispense helium therefrom, a vacuum source releasably connectable to the unit under test through a fitting, a helium detector fluidly coupled to the vacuum source, and a controller operatively coupled to the helium detector and the motion detector and configured to receive electrical signals indicative of the speed of motion of the helium dispenser as helium is dispensed from the helium dispenser.

In another aspect, a method for sensing a leak in a unit under test includes scanning a SKU on a unit under test, sending the SKU information to a compute, connecting the unit under test to a testing apparatus, removing gas from an interior volume of the unit under test, monitoring the vacuum pressure within the interior volume of the unit under test until the vacuum pressure reaches a test pressure, initiating delivery of helium to the exterior of the unit under test through a helium gun by pulling a trigger on the helium gun to dispense helium therefrom, positioning the helium supply gun so that helium is released over a weld of the unit under test, detecting the movement speed of the helium supply gun during the dispensing of helium therefrom, and displaying the helium content internal to the unit under test on a graphical user interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding herein, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
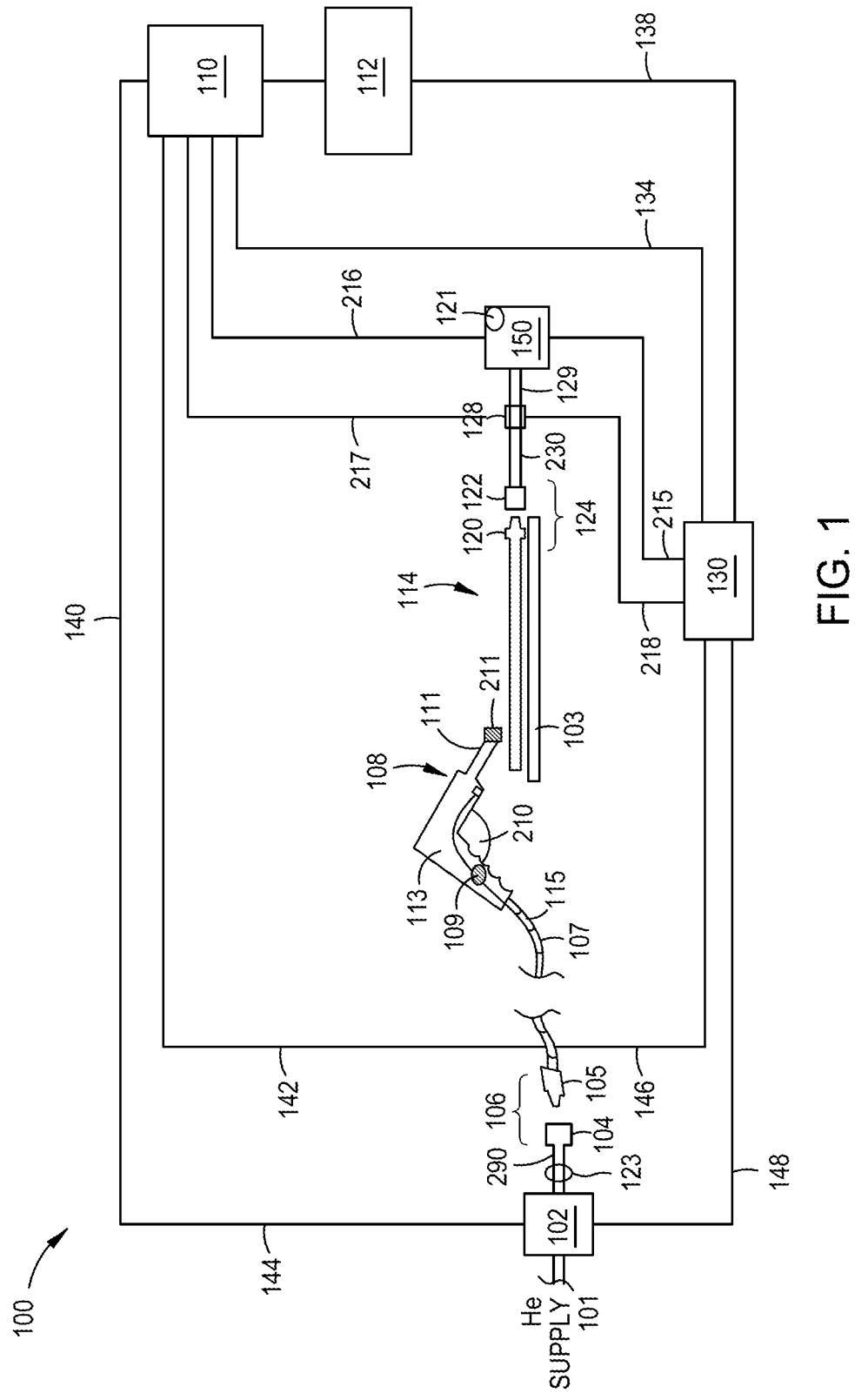
FIG. 1 shows a schematic view of a circuit for a leak detection test.

Referring to FIG. 1, a leak detection system 100 is shown. Here the leak detection system 100 is configured to:
a) Supply helium under the control of an operator to a to be leak checked location of a unit under test, such as a weld location thereof;
b) monitor the vacuum pressure in the unit under test so that the operator does not prematurely release the helium to the weld before the proper base vacuum pressure in the interior volume of the unit under test has been reached therein;
c) determine the presence and optionally an indication of the quantity of helium entering into the interior volume of the unit under test; and
d) provide a pass or fail indication of the unit under test.

In one aspect, a controller or programmable computer is provided, and is operatively connected to:
A vacuum pressure sensor capable of determining a vacuum pressure in the interior volume of the unit under test;
a flow controller to determine the flow rate of helium; and to
an indicia reader capable of determining the type and manufacturing lot of the unit under test.

The computer or controller is further configured to monitor the vacuum pressure within the unit under test and the helium flow controller to determine whether the vacuum pressure was properly reached before helium was dispensed to a leak check area of the unit under test and whether the operator has exceeded the speed or velocity of the dispense region of the helium dispenser during the release of the helium therefrom adjacent to the region of the unit under test being evaluated for leakage. The computer or controller is also configured to provide an indicia of passing or failing, and to provide a notification to the operator of an improper test requiring that the unit under test be retested. Further, the system 100 is useable to allow the operator, user, or other personnel to track the amount of helium detected within a unit under test by type of unit under teat, lot number, serial number or other indicia of identification, of a unit under test and multiple helium leak tests of multiple units under test and over time, to determine trends in the amount of helium detected and allow the manufacturer of the welds to have better visibility into process drift or process change indicated by trends in the change or drift of the amount of helium detected over multiple units under test and over time, for root cause analysis of the weld integrity purposes, and for preventive maintenance to reduce the number of defective welds produced by the manufacturing facility over theme. In the implementation of the system 100 described herein, a power supply 130 is provided, and all of the electrical power to operate the various electrically powered components of the system are supplied with power from the power supply. This allows components of the system 100 to be mounted into a rack or other such device for ease of use thereof, and to reduce clutter.

In the system 100 of FIG. 1, a helium supply 101, for example a factory helium supply having an outlet fitting such as a quick connect-disconnect fitting located adjacent to a test table 103 on which a unit under test 114 can be placed for testing, is provided. Alternatively, the helium can be supplied in a portable or moveable bottle, such as a bottle on a wheeled cart, or by other mechanisms and or structures.

The helium supply 101 is fluidly connected to the input port of a mass flow monitor 102. The mass flow monitor 102 measures, and thereby is useful for monitoring, the flow rate, and thus the amount, of the helium flowing through the helium gun 108 to which it is connected. The output port of the mass flow monitor 102 is connected, by a fluid supply tubing, to a two way coupling 106. The two way coupling 106 is comprised of a female fitting 104 and a male fitting 105. The fittings are cylindrical hollow metal fixtures wherein the female fitting contains a check valve composed of a spring biasing a ball against a sealing seat that allows the male fitting to fasten into the female fitting with a leak free seal, allowing helium to flow through the connected female and male fittings 104, 105. The male fitting 105 is connected to a fluid tubing 107, such as a flexible reinforced hose, leading and connected to the base of a helium gun 108.

The fluid tubing 107 supplies helium to the helium gun 108 through a connection thereto at the base thereof when the male and female fittings 105, 104 of the coupling 106 are connected together. The helium gun 108 is comprised of a body 113 shaped for ergonomic use by the hand of a user. Inside of the body 113 is a hollow flow conduit extending from the tubing 107 at the base of the helium gun 108 to the dispense nozzle 111, the flow through which is controlled by a valve (not shown) which is opened by an operator or user of the helium gun 108 depressing the trigger 210 of the gun, and closed off by the release of pressure on the trigger 210. The helium gun 108 (helium dispenser) can be moved around freely within the range of the length of the tubing 107 connected thereto, to allow the dispense nozzle 111 thereof to be moved over locations of a unit under test 114 where a helium leak check is be performed.

Internal to the body 113 is an accelerometer 109, which is used to measure motion of or acceleration of the helium gun 108. Here the accelerometer 109 is capable of discrimination acceleration in the x, y, and z axes. The accelerometer 109 is connected to an accelerometer cable 115 here wrapped around the tubing 107 and connected at a location, distal to the helium gun 108, where it is connected to a first CPU line 142 which may include a pair of accelerometer bus wires isolated from one another and extending from the connection thereof with the accelerometer cable 115 to the CPU 110. The first CPU line 142 communicates information to the CPU 110 in the form of an electrical signal output from the accelerometer in response to motion of the helium gun 108, and indicative of the speed of motion of the helium gun 108 while helium is being dispensed therefrom. The first CPU 142 line is configured to communicate information about the acceleration of the helium gun 108 and thus its velocity. A second CPU line 144 connects between the mass flow monitor 102 and the CPU 110, to carry a signal from the mass flow monitor to the CPU 110 indicative of the amount of helium flowing from the helium supply 101 and thus outwardly of the nozzle 111 of the helium gun 108. The flow rate of helium through the nozzle 111 of the helium gun 108 is monitored by the mass flow monitor 102, which outputs an electrical signal indicative of the helium flow therethrough, which is electrically communicated, to the CPU through the second CPU line 144. The CPU 110 is connected to the user interface 112. The user interface (UI) allows the user of the helium gun 108 to receive visual and auditory information about the operation of the system 100. If, during a test and while the helium is being dispensed from the helium gun 108, if the acceleration or movement speed of the helium gun 108 reaches a preset maximum threshold value, a signal is sent from the CPU 110 to the UI 112, and the UI 112 will display a failed test value and also, optionally, sound an audio alarm, display a video alarm, or both.

The system 100 also includes the testing apparatus hardware and facilities. This includes a vacuum source 150 connected, using a fitting, to a second fluid tubing 129. The vacuum source 150 is for example a "house" source, which is piped to multiple locations within the manufacturing, testing, or manufacturing and testing facility to be used in multiple locations within the facility, such as a facility preparing welded pipings or equipment using those welded pipings, or both, and here is accessible through a quick connect coupling located adjacent to the table 103 on which the helium leak test will be performed on a unit under test. This second fluid tubing 129 contains therein a Helium detector 128. For example, the helium detector 128 is positioned to be in fluid communication with the interior of the second tubing 129 through a T connection fitting to the vacuum tubing 129, for example by being threaded into the stem of the T connection fitting, the arms of the T-connection fitting connected in line within the second tubing 129. Thus, here, one arm of the T-connection fitting is fluidly connected to the house vacuum 150, the second arm is fluidly connected to a reinforced hose 230 leading to a coupling used to connect the vacuum 150 source to the unit under test 114, and the helium detector 128 is fluidly connected to the third arm or stem of the T connection. If helium is, as a result of the vacuum within the unit under test, pulled into the unit under test through pores in a weld or other portion of the unit under test 114 being evaluated, it will migrate to the helium detector 128 and the presence of helium in the interior volume of the unit under test 114 will be detected thereby. The helium detector 128 transmits an electrical signal related to the quantity or concentration of helium detected to the CPU 110, through a helium detector line 127 composed of one or more electrical conductors communicating electrical signals corresponding to helium detection by the helium detector 128, to the CPU 110. The helium detector 121 is powered by the power supply 130 and is connected to the power supply 130 through the helium detector power supply cable 218.

The interior volume of the second tubing 126 is, at one end thereof, fluidly connected to the interior volume of the unit under test 114 through the reinforced hose 230, which is selectively connectable to the unit under test 114 through a coupling 124. The coupling 124 is comprised of a female fitting 120 and a male fitting 120. The opposed end(s) of the unit under test 114 is sealed with a cap or other sealing device. The fittings are cylindrical hollow metal fixtures wherein the female fitting includes a check valve having a spring biasing a ball against a sealing seat that allows the male fitting to snap into and thereby fasten into the female fitting with a leak free seal, to connect the interior of the unit under test 114 to vacuum, and thereby reduce the pressure within the interior volume of the unit under test 114 down to a user specified base (vacuum) pressure at which the unit under test 114 is evaluated for leakage at the welds thereof. Additionally, the helium detector 128 is, as previously described, in fluid communication with the interior volume of the second tubing 129, and thus helium leaking through a weld in the unit under test 114 will be communicated to the helium detector 128 through the interior volume of the reinforced hose 230 and the second tubing 129. The female fitting 122 portion of the coupling 124 is welded or otherwise fluidly and sealingly connected to the end of the second tubing 129 and the male fitting 120 portion of the coupling 124 is sealingly connected to the unit under test 114. When the unit under test 114 is engaged with the male fitting 120, the open end of the piping of the unit under test 114 locks into a cylindrical recess in the male fitting 120 with a leak proof seal. When the male and female fitting 120,122 portions are fastened together, this creates a continuous leak free sealed line from the unit under test 114 to the vacuum source 150, with the helium detector 128 in fluid communication with the interior of the second tubing 129 at a location between the unit under test 114 and the vacuum source 150.

Although in some aspects hereof the vacuum source is a house or facility vacuum line to which the unit under test can be connected, in the example here, the vacuum source 150 is a vacuum pump connected to the power supply 130 through the power supply line 215 to supply electrical power to operate the vacuum source 150. In other aspects, the vacuum source 150 can be the aforementioned house or facility vacuum supply. When the vacuum source 150 is a separate vacuum pump, it is powered by the power supply 130. The vacuum source pumps gasses and vapors, typically air, water vapor, or both, from the interior volume of the unit under test 114, to bring the pressure of the interior volume of the unit under test 114 down to the desired test pressure. When helium is released over a weld region of the unit under test 114, if there are openings in and through the weld connection that are larger than a helium atom, the vacuum will pull the helium released near and along the weld through the weld, into the unit under test 114. The helium will migrate, or be pumped by the vacuum source 150, through the reinforced hose 230 and the second tubing 129 to the location of the helium detector 128 to be detected thereby.

Internal to the vacuum source 150, or within the second tubing 129, is a pressure sensor 121, which is connected to the CPU through the vacuum sensor line 216. The pressure sensor 121 emits an electric signal which is transmitted along the vacuum sensor line 216 which is indicative of the fluid pressure within the second tubing 129 and thus in the interior volume of the unit under test 114 connected thereto. When the unit under test 114 is initially connected, through the coupling 124 to the second tubing 129, the pressure in the second tubing 129, which had been pumped down to the base or test pressure and maintained thereat by being sealed with the check valve of the fitting 122, rises as the gas within the interior volume of the unit under test 114 migrates into the second piping 129. Then, the fluid (gas, water vapor or both) within the combined volume of the interior volume of the unit under test 114 and the interior volume of the second tubing 129, will begin to fall. The pressure sensor 121 sends electrical signals continuously, or at a desired refresh rate, to the CPU 110, and the CPU 110 generates a pressure based output to the UI 112, which displays a visual indication of the pressure within the interior volume of the unit under test 114, which should be the same or nearly the same pressure as that in the second tubing 129. The UI 112 can display the pressure as a number on the UI 112 display monitor, as well as graphically show the change in pressure within the unit under test 114 over time graphically on an X-Y axis where X is time and Y is pressure, and include a horizontal line on the graph displaying the threshold pressure at which the inner volume of the unit under test 114 has been lowered and reached the helium leak test pressure. The operator of the helium leak test on the unit under test 114 uses this threshold pressure line, and the dropping of the pressure below that threshold pressure line, as the indicator that one can begin the helium leak test on the unit under test 114.

The helium detector 128 is connected to the CPU 110 through the vacuum sensor line 216. The helium detector 128 is configured to output a signal indicating the detection of helium thereby, and of the relative concentration or amount of helium in the second tubing 129 during the test, which entered the fourth tubing 129 as a result of having passed through a weld and into the interior of the unit under test 114. Concentration information can also be raw detector information, indicating the interaction of individual helium atoms with the detector, the more atoms interacting with the helium detector 128, the greater the amplitude of the signal, or the number of individual signals representative of detection of an individual helium atom by the helium detector 128. The output of the helium detector 128 to the CPU 110 can be continuous, or based on the sum of the detections of helium during a discrete time period. This information sent to the CPU 110 is displayed on the UI 112 display as helium concentration information and is also plotted graphically on an X-Y axis, with the Y axis being the concentration and the x axis being time, along with the pressure information. A preset threshold helium concentration is defined by the operator for the amount of helium allowed to be detected by the helium detector 128 during a test thereof. Alternatively, the system 100 can be configured that the CPU 110 receives identity information of the unit under test 114, such as a bar code attached to the unit under test 114 and readable by a reader, which includes the type of unit under test 114. The information can also include the threshold helium detected at which the unit under test fails the helium leak test, or the CPU 110 can include therein a look up table comparing the identity of the unit under test 114 and the threshold of helium at which the unit under test 114 is considered to have failed the test. Additional information, such as the time at which the unit under test, or individual welds thereof, were fabricated, the work station(s) or equipment used to fabricate the unit under test 114, and the operator or operators whom assembled and welded together the tubing's making up the nit under test 114. As helium is the smallest atom that is inert, other gasses which may be passing through the unit under test 114 when it is installed in a piece of equipment will commonly have much larger atomic or molecular sizes, and cannot pass through an opening through the weld that is just at, or slightly larger than, the atomic diameter of helium. The CPU is configured to sound an alarm, or display a notice of failed test, if the threshold allowed amount of helium detected by the helium detector 128 is surpassed. This failure notification can be displayed visually on the UI 112 display as a failure signal through text, display of a red light, both or other indicia. The UI 112 can also transmit the failure signal as an audio alarm. Additionally, if the coupling 124 is not forming a proper sealed connection between the reinforced hose 230 and the unit under test 114, or if one or more welds of components connected into the unit under test are not sufficiently airtight, the vacuum source 150 will be unable to bring the pressure within the connected reinforced hose 230 and the unit under test 114 down to the test pressure, and the CPU can be configured to display or sound an alarm that there is a gross leak somewhere among the unit under test 114, the coupling 124 and the second tubing 129. The CPU 110 can be configured to cause an alarm to be sounded, displayed on the UI 112 display, or both, after a certain amount of time has passed since the unit under test 114 has been connected to the reinforced hose 230 but has not reached a desired vacuum pressure.

Figure 2:
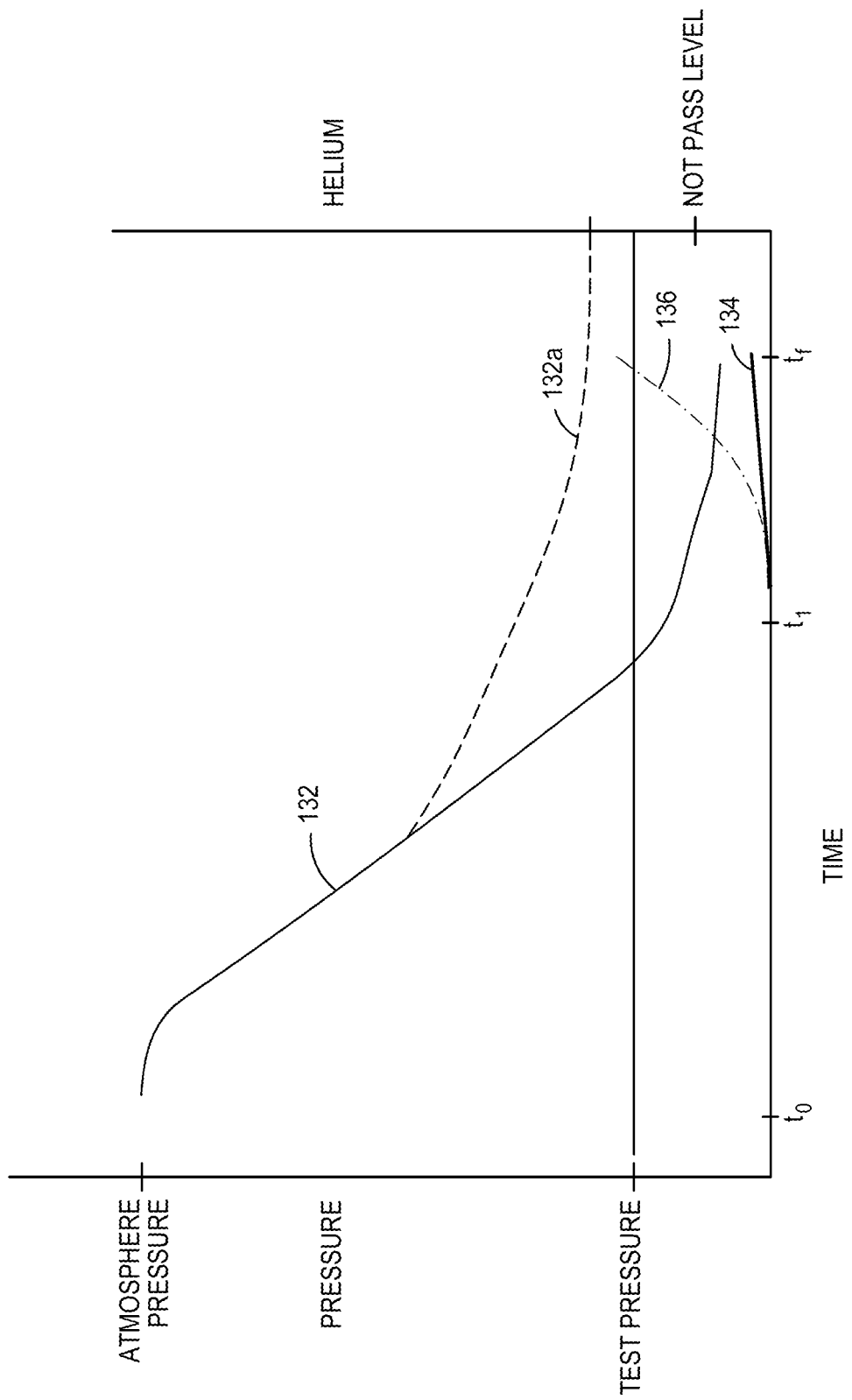
FIG. 2 shows a graph with measurements of the interior pressure of the unit under test, the helium detected, and time.

FIG. 2 shows graphically some of this information. FIG. 2 is a graph having the interior pressure of the unit under test 114 measured along the left hand side Y axis, the helium detected quantity displayed along the right hand Y axis, and time along the x-axis. Curve 136 is representative of the pressure in a unit under test 114. Here, at to, the unit under test is initially at atmospheric pressure and is connected to the vacuum supply 150 by connecting together fittings 120, 122, at which time the pressure within the unit under test 114, as detected by the pressure sensor 121, begins to fall. Over time curve 132 extends to a location below a test pressure, and at time $t_1$ the operator dispenses helium to the region of the unit under test 114 at a weld thereof. Curve 134, which should be evaluated based on the left hand Y axis, shows the amount or counts of helium atoms detected over time, beginning from when the trigger 210 on the helium gun was depressed by an operator. Here, the helium is slowly rising. The user establishes a test time period over which to dispense helium. Here, the not passing level is depicted on the right hand Y axis. Over the specified test period of $t_1$ to $t_f$, the cumulative helium detected is less than the not pass level, and the unit under test 114 is considered to have passed. In contrast, the curve for the helium detected 136 for a different unit under test 114 shows the cumulative helium detected is greater than the not pass level over the specified test period of $t_1$ to $t_f$, and this unit under test is rejected. Curve 132a in dashed line format shows the result where there is a gross leak somewhere in a connection of the test set up, the unit under test 114, or both, as the unit under test cannot reach the vacuum required to start testing. Here the operator will check all of the connections, and retest the unit under test. If the vacuum test pressure cannot be reached, the unit under test 114 is set aside, and a new unit under test 114 connected. If this second unit under test reaches the test pressure, the initial unit under test is rejected. If the second unit under test 114 cannot reach the test vacuum level, the operator needs to disassemble the vacuum components, check the vacuum pump to ensure it is operating correctly, and rebuild the test setup. Thereafter, the two units under test, which did not reach the vacuum test pressure, are retested.

Of the issues effecting the validity of the helium leak test results, one is human error. One human error occurring during testing is the test operator delivering or releasing the helium from the helium gun 108 over or adjacent to the portion of the unit under test 114 being evaluated for a helium leak before the interior pressure of the unit under test 114 has reached the desired test pressure, which is a vacuum pressure substantially below the surrounding ambient air pressure where testing is occurring. The likelihood of helium entering an opening in the unit under test 114 capable of having helium pass therethrough, and the amount of helium gas being pulled through the opening, is a function of helium availability at an opening it can pass through, and the difference in pressure between the interior volume and the exterior of the unit under test 114. The amount of helium being dispensed by the helium gun is digital, as the helium gun is calibrated frequently by dipping the tip end of the helium gun into a liquid and determining the amount if gas released when the trigger 210 is pulled and adjusting the helium pressure or the helium gun 108 to maintain the desired volumetric flow per unit time. The internal valving of the helium gun 108 moves between a fully open and a fully closed state, so that the helium flow cannot be modulated between full flow and zero flow. Thus, the main variable effecting the validity of the test is the amount of helium likely to pass through openings or porosity in, for example a weld 140, given a desired release of helium in the vicinity of the porosity or opening. The testing of the unit under test 114 is calibrated based on the helium flow rate from the helium gun and the difference in pressure between the interior of the unit under test 114 and the exterior thereof.

If the helium gun 108 flow rate is properly calibrated, starting the testing before the interior volume of the unit under test 114 has reached the desired level of vacuum pressure therein will result in fewer helium atoms being pulled through an opening or porosity in the weld or piping of the unit under test 114, resulting in a unit under test being termed a test passing unit when it should not be considered a test passing unit, The CPU 110 is configurable to prevent helium dispensing until the pressure within the unit under test has reached the desired test pressure, or to provide the alarm signal described previously therein if the vacuum pressure within the unit under test 114 had not reached the desired test pressure before testing was initiated by releasing helium from the helium gun 108.

To prevent helium from flowing before the desired vacuum pressure is reached in the unit under test 114, the CPU is optionally configured to send a control signal to a valve 123 in the helium supply line, to open the valve only once the proper vacuum pressure has been reached in the unit under test 114.

Another operator induced error in helium leak testing involves the operator moving the helium gun tip too quickly past the area of the unit under test 114 being evaluated for a leak. Here, the CPU is configured to read the signal received from the accelerometer 109 in the helium gun to indicate that the helium gun was moved too quickly, and the operator must redo the test by pumping the interior volume of the unit under test to the desired vacuum pressure thereof, and redo the leak test. In this fashion the system 100 increases the user's confidence in the meaningfulness and accuracy of the helium leak test to find undesirable porosity of leak paths in the weld or tubing being checked.

Figure 3:
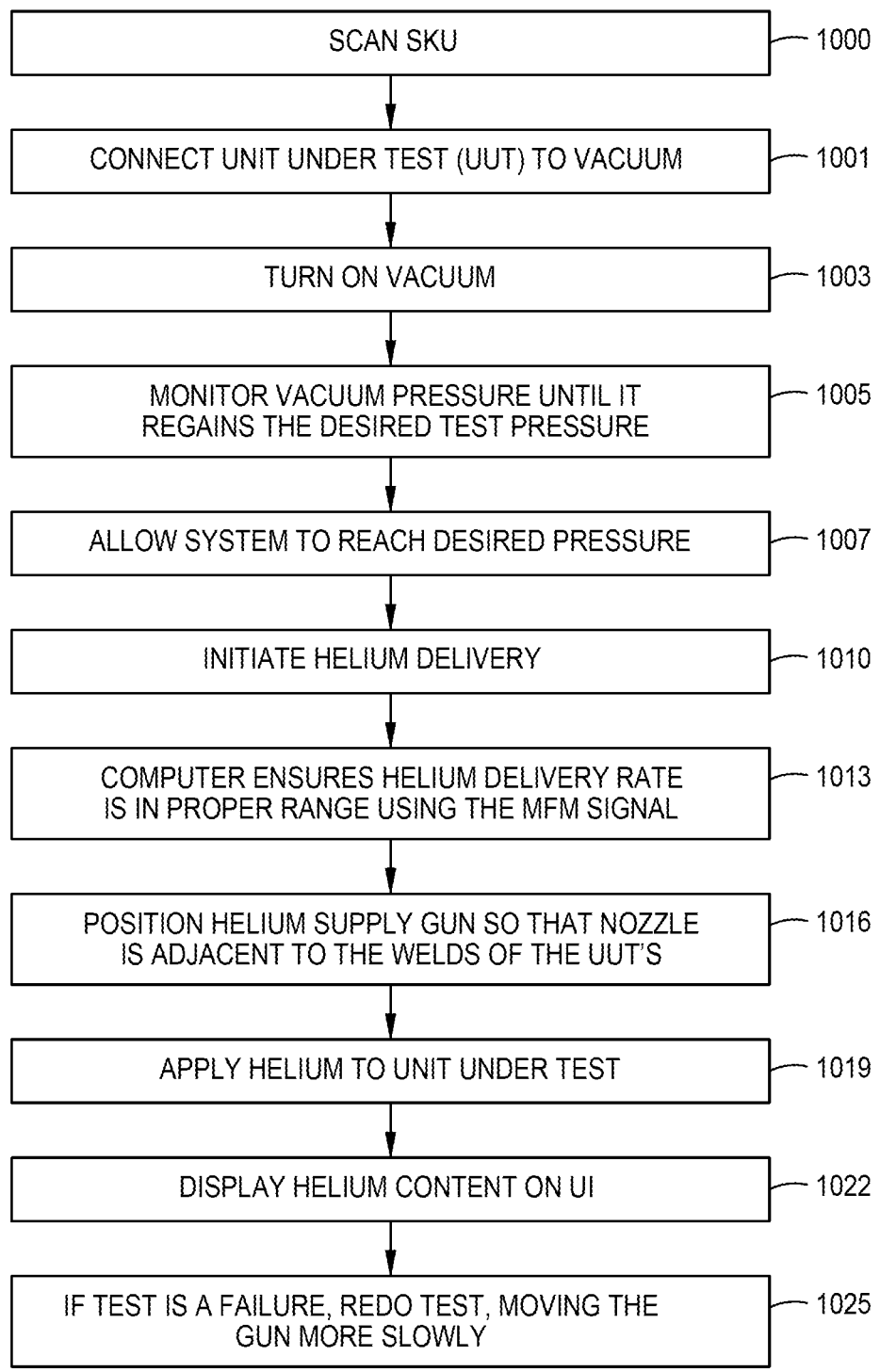
FIG. 3 shows a flowchart for a method for a leak detection test.

A method for allowing repeatable helium leak testing of a unit under test is shown in FIG. 3. At Act 1000, a SKU code on the unit under test 114, uniquely identifying the unit under test, including information such as the part number, the time it was completed, and other information as desired by the operator, is scanned and the information read by the CPU 110 and the CPU 110 is configured to associate the SKU number of the unit under test with the resulting test responses indicating a passing or failing unit under test 114. Then, the unit under test 114 is fastened securely to the male fitting 120 of the coupling 124, and the male fitting 120 is inserted into the female fitting 122 of the coupling 124 at Act 1001. This creates a leak free seal between interior volume of the unit under test 114 and the second tubing 129 with the vacuum source 150. In one aspect, the vacuum source 150 may be started in Act 1003. In other aspects, the vacuum source 150 remains on and operational, to maintain a subatmospheric pressure in the reinforced hose 230. As the vacuum 150 is turned on and starts to apply pressure to the unit under test 114, the UI 112 will display the pressure internal to the unit under test 114. The operator monitors the change in the vacuum pressure internal to the unit under test 114 Act 1005. A desired system pressure for a test to be performed to a unit under test is determined by the operator, based on the pressure of the internal volume of the unit under test 114 displayed on the user interface 112, or the CPU may be programmed with this set test pressure and display or audibly emit information the operator can use to visually, graphically, or audibly determine that the test pressure has been reached. This test pressure is a set pressure at which the unit under test 114 would most appropriately respond to application of helium at or adjacent to any possible microscopic leaks in the unit under test 114, and at which the system as a whole maintain the set vacuum pressure without further intervention. At Act 1007 the operator allows the unit under test 114 to reach the desired pressure, the test pressure, by visually watching the pressure read out on the UI 112 or allowing the CPU to monitor the pressure and create an alert through the UI 112 when the unit under test 114 reaches the test pressure. At the point that the pressure reaches the desired testing pressure, the operator can initiate helium delivery using the helium gun 108 in Act 1010. The operator will dispense helium through the nozzle 111 of the helium gun by pulling the trigger 210 external to the body 113 of the helium gun 108. The trigger 210 being opens a valve internal to the helium gun to allow helium to escape the nozzle 111 at a desired and pre calibrated constant flow rate. The flow rate is determined by an output of the mass flow monitor 102 (MFM) fluidly connected to the helium supply 101. The MFM signal is used by the CPU 110 to determine that helium is released only after the test pressure within the unit under test 114 is reached and if it is released when the pressure is above the test pressure, a failure signal is sent by the CPU 110 to the UI 112. This signals the operator to re-do the test while waiting for the appropriate test pressure to be reached. Alternatively, the CPU 110 controls a fluid switch on the helium line such that helium cannot flow from the helium source until the test pressure is reached in the unit under test 114. If the operator attempts to run a test when the CPU 110 has not received a pressure signal from the pressure sensor 121 that appropriately meet the pressure set to be the testing pressure, a failure signal will be displayed by the CPU. The CPU 110 ensures helium delivery rate is in proper range using the MFM signal in Act 1013.

Once the helium flow rate is in proper range, the operator positions the helium gun 108 at points of interest of the unit under test 114. Specifically, at Act 1016 the operator positions the helium gun 10 so that the nozzle 111 is adjacent to a weld 140 of the unit under test 114 to test for leaks in the welds. At Act 1019 the operator will apply the helium to these points of interest, such as the welds of the unit under test 114, by pulling the trigger 210 to release the helium gas from the nozzle 111 of the helium gun 108. If there is a leak in the unit under test 114, the helium will pass through the physical openings allowing the leak and be pulled into the unit under test 114 and flow either through the pull of vacuum pressure or by dispersion to the helium detector 128. When an atom of helium reaches the helium detector, a reaction will occur in which the helium detector is able to identify the helium atom and send a signal regarding the concentration of helium atoms detected to the CPU 110 through vacuum sensor line 216. The concentration of helium internal to the unit under test 114 will be displayed on the UI 112 in Act 1022. A threshold amount of helium at which a failure of the weld test is declared is set by the operator, or, is stored in a look up table in the CPU and used to set the threshold of helium detection at which a failed weld or unit under test 114 is declared. If the helium detector detects more than the threshold amount of helium, the UI will display a failure notice. The CPU 110 will add the helium concentration data, failure notice data, and SKU number data representing the actual unit under test 114 that has failed to a database that can be accessed by the operator or other personnel. This data base will allow the operator or other personnel to determine if there is a flaw in manufacturing and where this flaw began, using the SKU number to identify the equipment and materials used to create the unit under test, the times at which the various welds where made on the unit under test, and the technicians making those welds and making up the unit under test 114. This allows the operator or others to make decisions regarding manufacturing before extending resources to create further leaking units under test 114. Additionally, this same data is collected for passing units under test, and the amount of helium detected, and changes thereof from unit under test to unit under test can be used to identify issues in the equipment, raw materials, or individuals involved in the manufacture of the units under test, to enable preventive maintenance, identify problematic lots of raw material, including trends in the performance thereof over time, ad to train or retrain technicians fabricating the units under test. The data can also be used to reduce the variance in the manufacturing process, by identifying the who, where, what and when of the manufacturing process of the units under test and tracking it to variations in resulting test performance.

In addition, if the accelerometer 109 within the helium gun 108 detects that the helium gun 108 is being moved too quickly by the operator, the UI 112 will display a failure notice and this accelerometer data and failure data will be added to a database accessible by the operator or others. Receiving a failure notice will prompt the operator to redo the test at Act 1025, moving the gun more slowly this time. This will allow proper residence time of the nozzle of the helium gun 108 at leak sites for helium to penetrate the unit under test if there is a leak. Based on the failure rate of the operator due to accelerometer based test failures, a determination can be made if further training is needed for the test operator.

Figure 4:
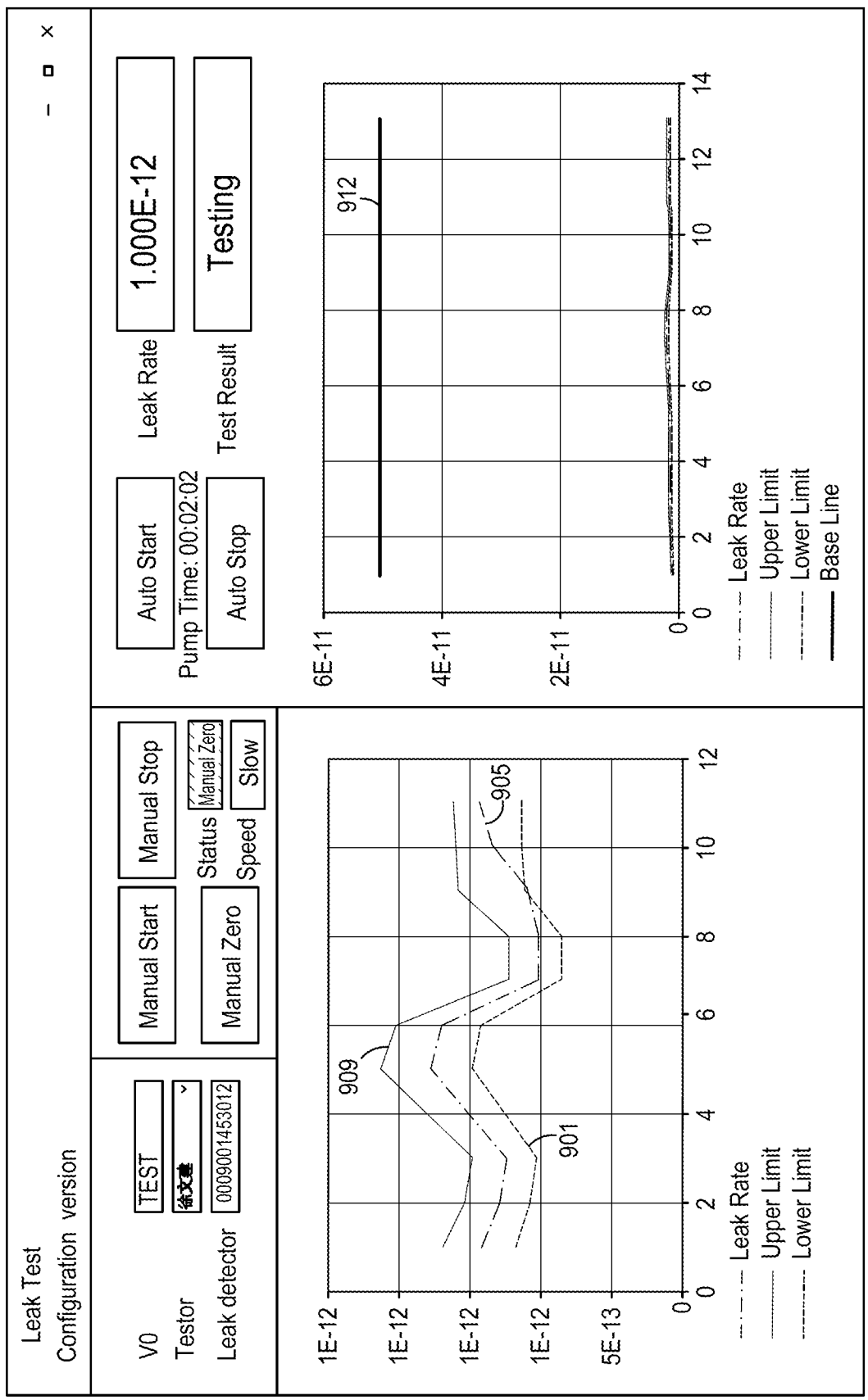
FIGS. 4-6 show a user interface graphical display depicting different outcomes of a leak test.
Figure 5:
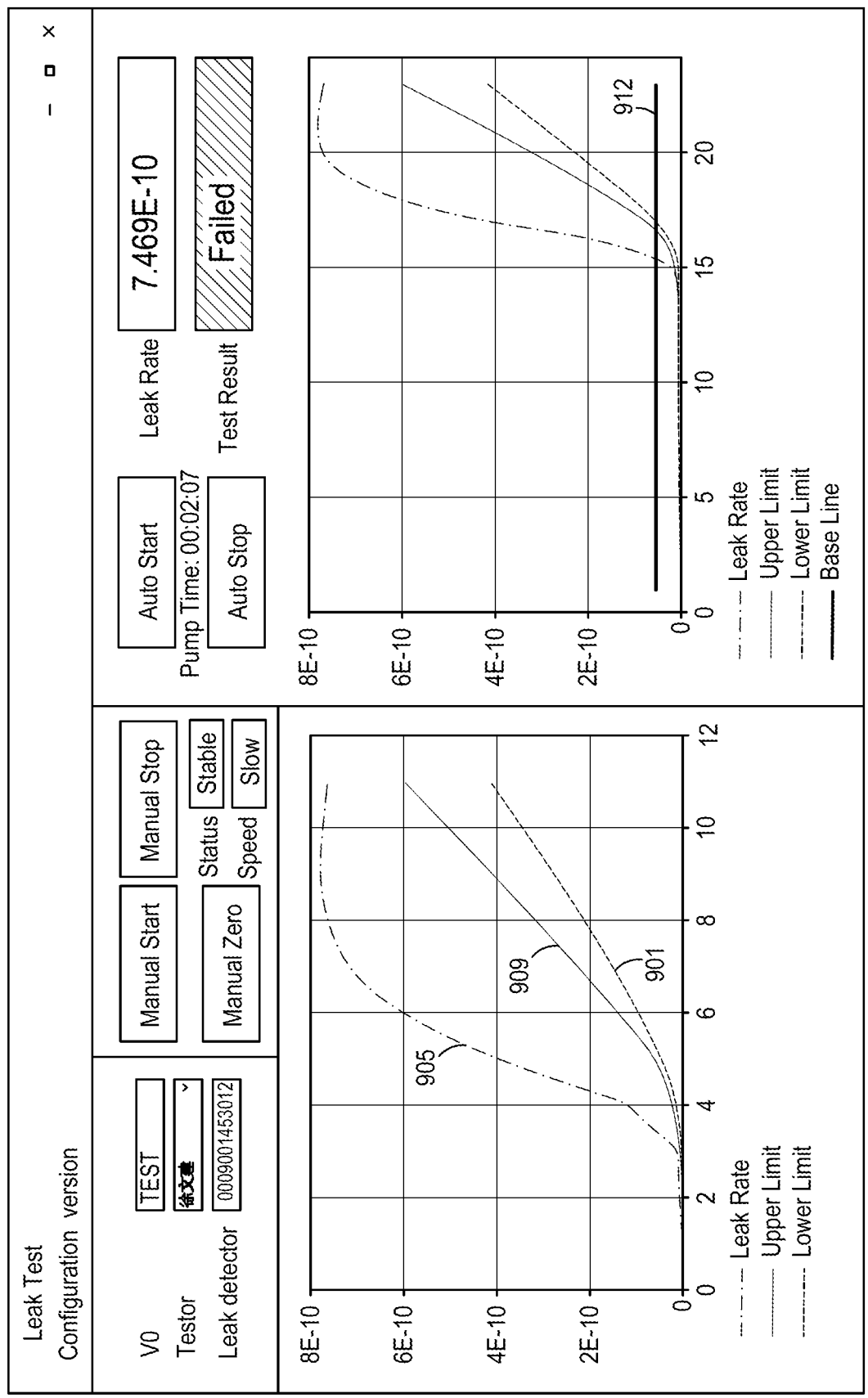
Figure 6:
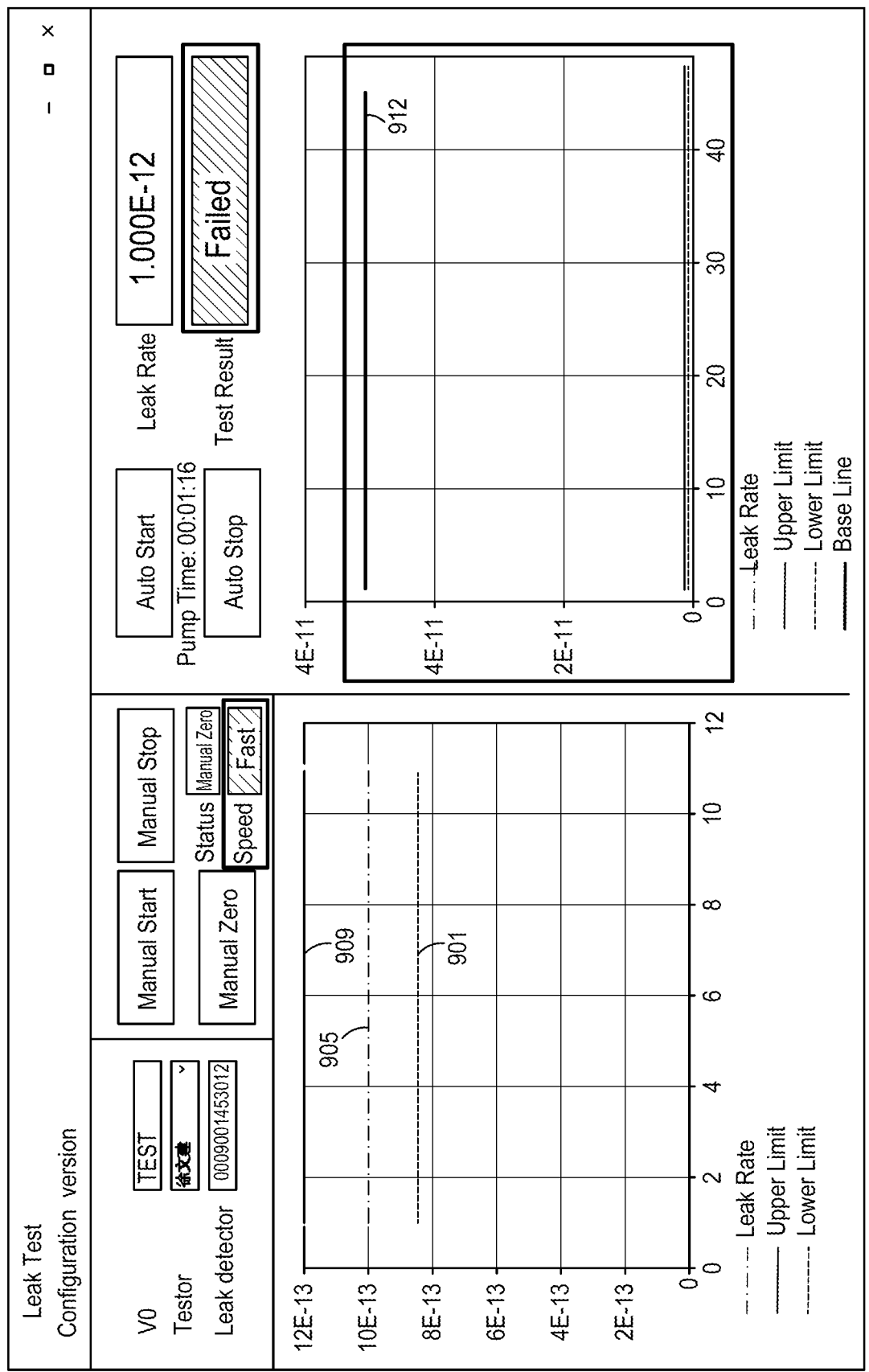

FIGS. 4 through 6 show the UI 112 screen that the helium gun operator will see while performing the leak test. The UI screen 112 displays the SKU barcode of the unit under test 114 that has been scanned for a leak test. The UI 112 shows a series of information graphics about the unit under test 114. A first rate graph displays an upper limit 909 for a leak reading and a lower limit 901 for a leak reading, along with the actual leak reading 905. The threshold limits are defined by the operator and are based on the vacuum pressure in the unit under test as well as the rate of helium delivered from the gun. A second graph compares helium concentration 912 in the unit under test with helium being delivered from the helium gun. In the operator panel, the UI displays an interactive manual start and stop for the leak test, based on the vacuum pressure in the unit under test. The UI displays information about the status and speed of the test. The UI displays an auto start and auto stop interface as well. Vacuum pump time is displayed during active testing. The UI displays a lead rate and gives a status of testing or failure depending on the circumstances. FIG. 3 shown a test during active testing. FIG. 4 shows a leak test that has failed due to the leaks in the unit under test. This is shown by the test result information reading a failure signal, as well as the leak rate graphical displayed surpassing the upper leak limit. The information regarding the speed of the helium gun reads slow, indicating that the gun was not moved too quickly for effective testing. FIG. 4 shows a leak test that has failed due to the helium gun moving too quickly during testing. This is indicated by the leak rate 905 resting within the upper and lower limits 909, 901 respectively but the speed indicating a fast reading.

Figure 7:
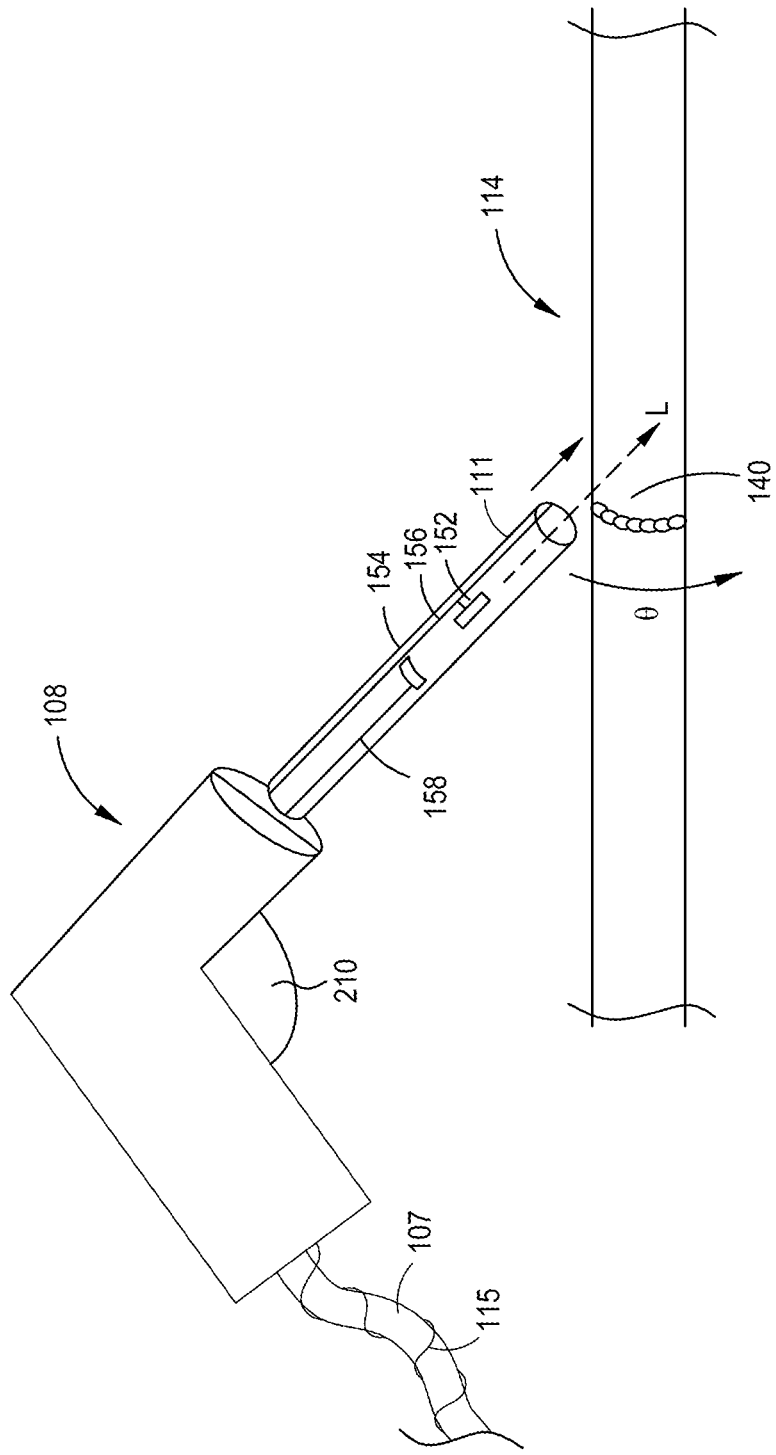
FIG. 7 shows an alternative construct of an accelerometer in a leak test.

FIG. 7 shows an alternative construct of the accelerometer layout of the test system. Here, a first accelerometer 152 and a second accelerometer 154, each separately connectable to the First CPU line 142 via first and second accelerometer leads 156, 158 configured to carry signals output by the first and second accelerometers 152, 154, are provided. First accelerometer 152 is configured to be particularly sensitive to movement of the output nozzle 111 in the centerline direction L thereof, and second accelerometer 154 is configured to be particularly sensitive to movement of the output nozzle 111 in the rotational direction Θ about the centerline direction thereof. The use of two accelerometers and the mounting of them on the nozzle 111 close to the gas output location thereof increases the accuracy of the speed detection of the helium gas releasing portion of the helium gun 108. However, a single accelerometer, on or within the nozzle 111, is also specifically contemplated herein.

What is claimed is:

1. An apparatus for detecting a leak in a unit under test, comprising:
   a helium dispenser connectable to a helium gas source having a motion detector connected thereto, the helium dispenser configured to selectively dispense helium therefrom;
   a vacuum source releasably connectable to the unit under test through a fitting;
   a helium detector fluidly coupled to the vacuum source; and
   a controller operatively coupled to the helium detector and the motion detector and configured to receive electrical signals indicative of a speed of motion of the helium dispenser as helium is dispensed from the helium dispenser
   the motion detector further comprises a first accelerometer and a second accelerometer;
      the helium gun including a nozzle having an opening therein for the dispensing of the helium therefrom; and
      the first accelerometer and the second accelerometer are disposed within the nozzle.

2. The apparatus of claim 1, wherein the controller is further configured to receive a signal from the helium detector indicative of a quantity of helium detected by the helium detector.

3. The apparatus of claim 1, further comprising a pressure sensor in fluid communication with an interior of the unit under test, the pressure sensor connected to the controller and configured to send a signal to the controller indicative of the pressure within the unit under test.

4. The apparatus of claim 1, wherein the helium dispenser further comprises a depressible trigger, which when depressed, allows a flow of helium from the helium dispenser.

5. The apparatus of claim 1, wherein the motion detector is at least one accelerometer.

6. The apparatus of claim 1, comprising a fluid tubing having a helium detector in fluid communication with an interior volume thereof.

7. The apparatus of claim 1, wherein the nozzle has a centerline direction, and the first accelerometer is configured to detect motion along the centerline direction.

8. The apparatus of claim 1, wherein the nozzle has a centerline direction, and the second accelerometer is configured to detect motion circumferentially about the centerline direction.

9. A method for sensing a leak in a unit under test, comprising:
   scanning a SKU on a unit under test giving SKU information;
   sending the SKU information to a computer;
   connecting the unit under test to a testing apparatus;
   removing gas from an interior volume of the unit under test;
   monitoring a vacuum pressure within the interior volume of the unit under test until the vacuum pressure reaches a test pressure;

initiating delivery of helium to an exterior of the unit under test through a helium gun by pulling a trigger on the helium gun to dispense helium therefrom;
providing the helium gun comprising a motion detector, the motion detector comprising a first accelerometer and a second accelerometer;
the helium gun including a nozzle having an opening therein for the dispensing of the helium therefrom; and
the first accelerometer and the second accelerometer are disposed within the nozzle;
positioning the helium gun so that helium is released over a weld of the unit under test;
detecting a movement speed of the helium supply gun during dispensing of helium therefrom; and
displaying a helium content internal to the unit under test on a graphical user interface.

10. The method of claim 9, further comprising the first accelerometer and the second accelerometer internal to the helium gun transmitting a signal to a computer monitoring a leak test.

11. The method of claim 10, further comprising designating a unit under test as not passing the leak test and notifying a failure notice through a notice on a user interface comprising a visual alert, an audio alert, or a visual alert and an audio alert.

12. The method of claim 11, further comprising designating a unit under test as not passing the leak test and notifying a failure notice through a notice on the user interface occurs as a result of a movement of the helium supply gun at a speed faster than a pre-established speed.

13. The method of claim 9 further comprising establishing a range of helium detected within a unit under test, which is acceptable for the unit under test.

14. The method of claim 13 further comprising failing the unit under test and notifying a failure notice through a notice on the user interface comprising a visual alert and an audio alert and a graphical display of a helium amount out of a range of acceptable helium within the unit under test.

15. The method of claim 14 further comprising transmitting the SKU information and failure notice to a database.

16. The method of claim 15 further comprising analyzing the database to determine a failure time point for a manufacturing process.

\* \* \* \* \*